Patented Aug. 1, 1944

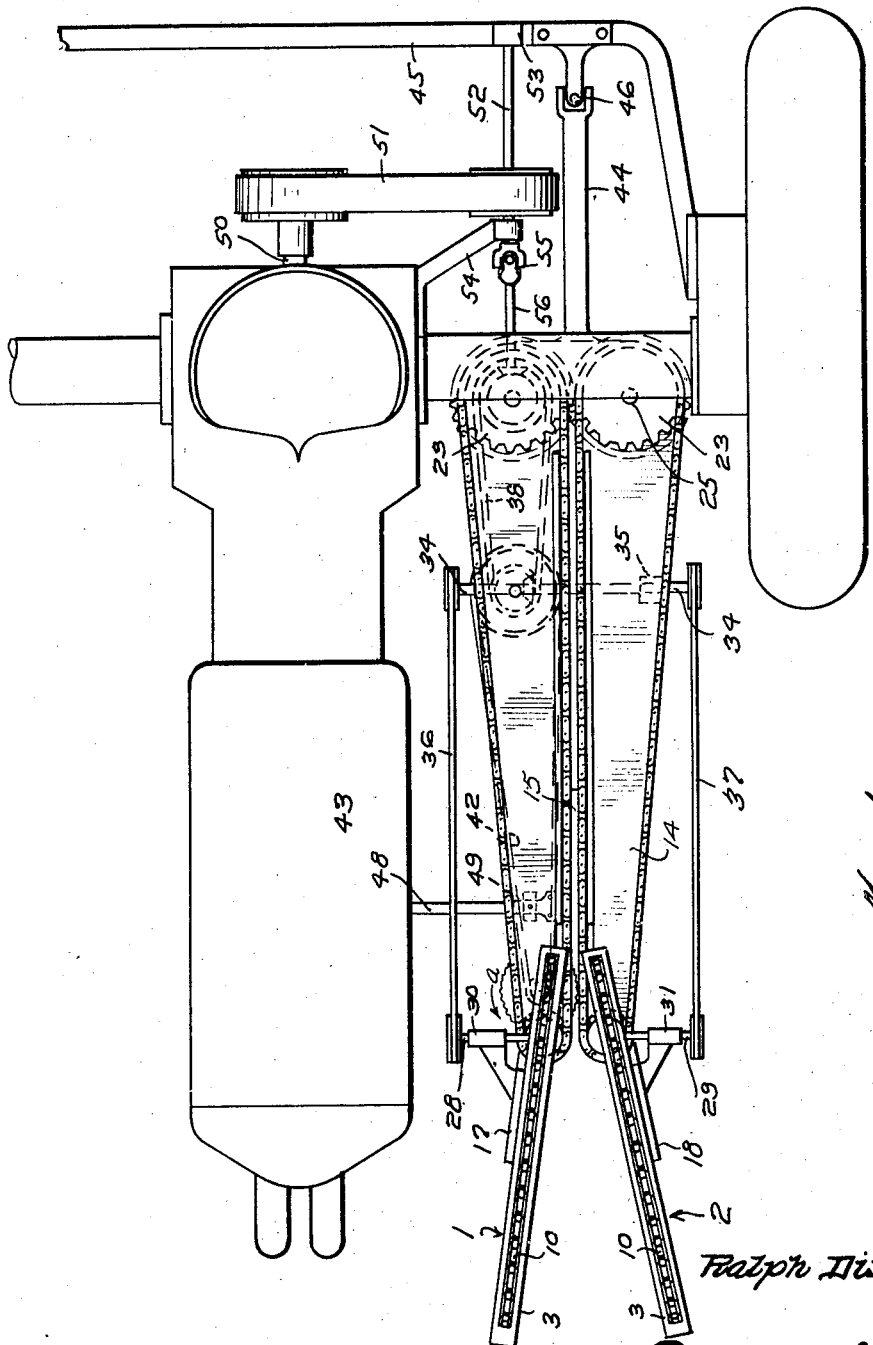

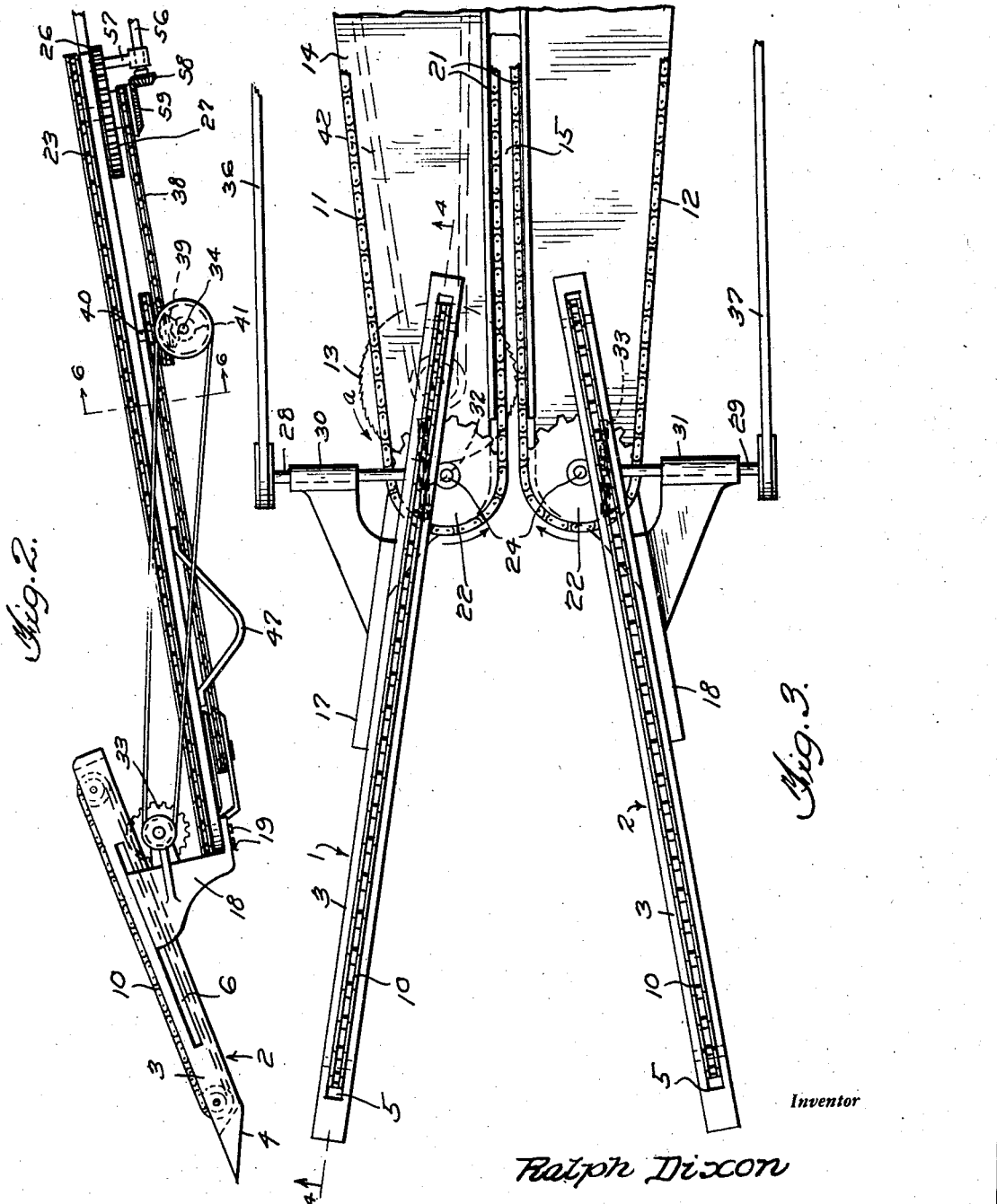

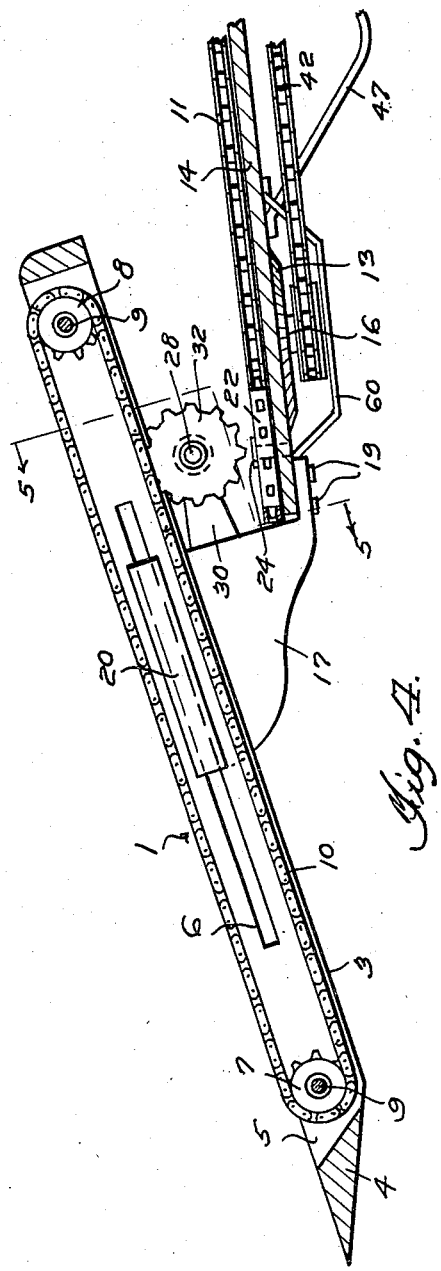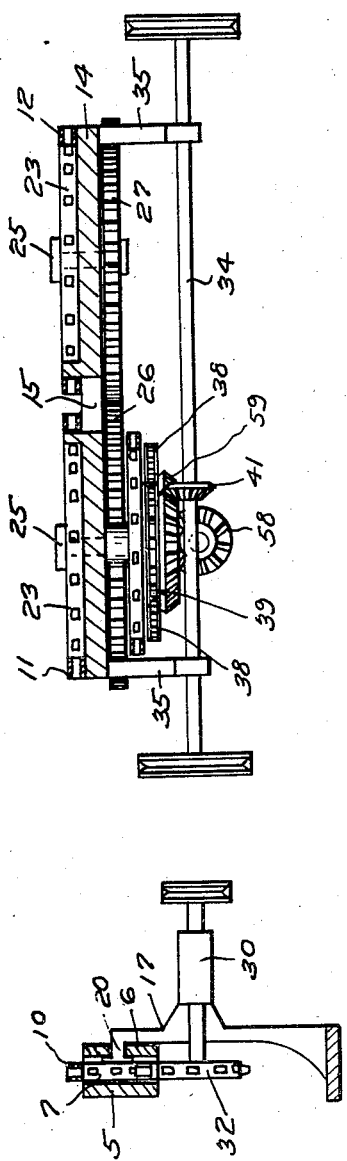

2,354,986

UNITED STATES PATENT OFFICE 2,354,986

HARVESTING MECHANISM

Ralph Dixon, New Rochelle, N. Y.

Application May 24, 1943, Serial No. 488,231

5 Claims. (Cl. 56—157)

My invention relates to improvements in harvesting mechanism for use especially, although not necessarily, in harvesting dried beans.

Among the important objects in view are to provide a simply constructed, efficient mechanism designed to be propelled over the ground as an attachment to a tractor, combine reaper, or the like, and for power operation to lift and straighten up bean vines, maintain the same straight as the mechanism is propelled along rows of bean vines, cut off the vines above the ground, and convey the cuttings rearwardly for disposal as desired in a suitable receptacle or the like.

Another object is to provide mechanism of the character and for the purposes above set forth which is especially designed for efficient operation in fields in which the ground is uneven, adapted for operation from a power take-off of a tractor, combine reaper, or other agricultural machine, and which operates to gradually lift and straighten up the vines to thereby obviate mutilating the same.

Other and subordinate objects are also comprehended by my invention, all of which, together with the precise nature of my improvements and the advantages thereof, will be readily understood when the succeeding description and claims are read with reference to the drawings accompanying and forming part of this specification.

In said drawings:

Figure 1 is a view in top plan of my improved harvesting mechanism attached to a tractor, Figure 2 is a view in side elevation of the harvesting mechanism detached, Figure 3 is a fragmentary view in top plan of the harvesting mechanism drawn to an enlarged scale, Figure 4 is a view in vertical longitudinal section taken on the line 4—4 of Figure 3, Figure 5 is a view in vertical transverse section taken on the line 5—5 of Figure 4 and drawn to a further enlarged scale, and Figure 6 is a view in transverse section taken on the line 6—6 of Figure 2 and drawn to a still further enlarged scale.

Referring to the drawings by numerals, the primary elements of my improved mechanism are a pair of opposed, elongated front lifting and straightening units 1, 2, respectively, inclining upwardly and rearwardly and converging rearwardly, relatively, each unit, which is a counterpart of the other, comprising a beam-like skid, or runner, 3, having a beveled front end 4 designed to slide over the ground, a longitudinal slot 5 in the vertical plane of the skid extending substantially from end to end thereof, and a longitudinally extending central slot 6 in one side of the same. Each skid 3 carries a pair of front and rear sprocket wheels 7, 8 in the front and rear ends of the slot 5 rotatable about transverse shafts 9, and a sprocket chain 10 trained around the pair of sprocket wheels with an upper run arranged slightly above the top of the skid parallel with said top. The sprocket chains 10 are designed to be driven so that the upper runs thereof travel rearwardly as the units are propelled forwardly along opposite sides of a row of vines, and to pick up the branches of the vines, progressively lift the same up so that the vines may be gripped below the tops thereof by a pair of conveyor chains 11, 12, and then cut off by a rotary cutter 13, and subsequently conveyed by said chains 11, 12 rearwardly of the mechanism.

In the illustrative adaptation of the invention, said units 1, 2 are mounted, as presently described, at the front end of a table-like flat bed 14 with their rear ends overlying said front end upon opposite sides of a slot 15 in the bed extending rearwardly from the front end of the bed in the longitudinal center thereof for a distance sufficient to permit the vines to pass by the rotary cutter 13 which has the form of a saw-toothed, beveled edge disk mounted adjacent the front end of the bed 14 at one side thereof on a stud shaft 16 depending from the bed, the cutter extending across the slot 15 as best shown in Figure 3.

The lifting and straightening units 1, 2, are mounted on said bed 14 by means of a pair of brackets 17, 18 bolted to the bed, as at 19, and extending forwardly and upwardly therefrom, said brackets having right angled, upper edge T-flanges 20 extending through the side slots 6 of the skids 3, respectively, and serving as guides upon which said units 1, 2 are endwise slidable rearwardly and upwardly when the skids 3 are being propelled over uneven ground surfaces and are obstructed by such surfaces, or tend to dig into the same, to thereby obviate the breaking of the skids.

The pair of conveyor chains 11, 12 are arranged on top of the bed 14 upon opposite sides of the longitudinal center of the bed to provide opposed inner runs 21 spaced apart parallel with said center at opposite sides of the slot 15. Each sprocket chain 11, 12 is trained around a pair of front and rear sprocket wheels 22, 23 fast upon upright front and rear shafts 24, 25, respectively, suitably journaled in the bed 14. The conveyor chains 11, 12, are designed to be driven in unison in directions such that the inner runs thereof travel rearwardly at the same rate of speed. For this purpose, the shafts 25 of the rear sprocket wheels 23 are geared together beneath the bed 14 by means of a pair of like, meshing gears 26, 27 fast on the lower ends of said shaft 25, respectively, and one of which is designed to be power driven, for instance the gear 26.

For driving the sprocket chains 10 of the lifting and straightening units 1, 2, a pair of horizontal driven shafts 28, 29 are journaled in side bearings 30, 31 on the brackets 17, 18, respectively, to extend crosswise of said units beneath the chains 10, in the rear of said brackets 17, 18, and said shafts are equipped with sprocket wheels 32, 33, engaging the bottom runs of said chains 10, respectively. A transverse shaft 34 is journaled in bearings, as at 35, on the bed 14 to extend beneath said bed. Belt and pulley connections 36, 37 are provided between opposite ends of the shaft 34 and the outer ends of the shafts 28, 29 respectively. The shaft 34 is driven from the power driven gear 26 by a sprocket and chain connection 38 from the hub of the gear 26 to a beveled gear 39 rotatably mounted beneath the bed 14, at one side thereof, on a suitable shaft 40 depending from said bed, said gear 39 meshing with a suitable beveled gear 41 fast on said shaft 34. It may be explained that because of the convergence of the units 1, 2, the sprocket chains 10 incline laterally, slightly, across the tops of the sprocket wheels 32, 33, but, in actual practice may be made wide enough, relative to the width of the teeth of said wheels, and with links sufficiently long, so that the teeth of said wheels 32, 33 will enter the links notwithstanding such lateral inclination of said chains.

The cutter 13 (illustrated) is rotated in the proper direction, i. e, counter-clockwise as viewed in Figures 1 and 3, as indicated by the arrow $a$, by means of a sprocket and chain connection 42 arranged beneath the bed 14 for operation by the sprocket and chain connections 38.

By way of exemplification, only, the described harvesting mechanism has been shown as attached to a tractor 43 to be propelled alongside the same over the ground and otherwise operated by said tractor. As illustrated in Figure 1, a pusher bar 44 extending rearwardly from the rear end of the bed 14 in the longitudinal center thereof is connected at its rear end to a rear chassis bar 45 of the tractor by a universal joint 46, whereby the harvesting mechanism is vertically movable independently of the tractor as it is propelled by the tractor so that said mechanism may ride over uneven ground, and a pair of V-shaped runners 47 are provided on the front end of the bed 14 upon opposite sides thereof to support said bed at the front end thereof in forwardly and downwardly inclined position. To maintain the harvesting mechanism parallel with the path of travel of the tractor 43, a tie rod 48 is extended from the tractor 43 laterally and connected, by a universal joint 49, to the bed 14 adjacent the front end thereof.

A drive from the usual rear end, power take-off shaft 50 of the tractor 43 to the power-driven gear 26 is provided in the form of a belt and pulley connection 51 between said shaft 50 and a longitudinal shaft 52 journaled at its rear end in a bearing 53 on the chassis bar 45 and having its front end journaled in a bearing bracket 54 suitably attached to said tractor. The front end of the shaft 52 is operatively connected, by a universal joint 55, to a forwardly extending shaft 56 journaled in a bearing bracket 57 depending from the bed 14 and operatively connected in any suitable manner to the gear 26 by beveled gears 58, 59, respectively. If desired, a suitable guard, in the form of a downwardly bowed bar 60, may be provided on the under side of the bed 14 to extend beneath and prevent fouling of the cutter 13.

As will now be seen, as the described harvesting mechanism is propelled forwardly over the field or ground, the lifting or straightening units 1, 2 will guide the vines to the conveyor chains 11, 12 and cutter 13 with the vines straightened up and the tops lifted so that said vines may be cut off by the cutter 13 and gripped by the inner runs of said conveyor chains to be carried thereby to the rear of the mechanism for deposit in a storage receptacle or other container, or otherwise as occasion may require. The conveyor chains 11, 12 will grip the cut-off vines between the inner runs 21 thereof, at first with the vines substantially upright, and transport the vines upright rearwardly through the slot 15. After the slot 15 is passed, the vines will be dragged by said runs of the chains, between the same, rearwardly over the bed 14 and ejected rearwardly thereby off said bed. Any suitable receptacle, not shown, may be attached to the rear end of the bed 14 to catch the ejected vines.

The foregoing will, it is believed, suffice to impart a clear understanding of my invention without further explanation.

Manifestly the invention, as described, is susceptible of modification both as regards structure and arrangement of parts, without departing from the inventive concept, and right is herein reserved to such modifications as fall within the scope of the appended claims.

What I claim is:

1. A bean harvesting mechanism comprising an elongated support adapted to be propelled endwise along a row of bean vines, vine lifting and straightening means at the leading end of said support comprising a pair of opposed elongated beam-like skids inclining upwardly and rearwardly in relatively converging relation from the ground and having front ends slidable over the ground, a pair of endless vine pick-up link chains embodied in said skids, respectively, and having top runs operative rearwardly along and above said skids, means to mount said skids on said leading end of the support for endwise adjustment when sliding over uneven ground, a rotary cutter on the underside of said support adjacent said leading end thereof operative for cutting off the vines straightened up by said units, means on said support operative to convey the cut vines rearwardly along said support, and driving mechanism for said pair of chains operative under operation of the last mentioned means.

2. A bean harvesting mechanism comprising an elongated support adapted to be propelled endwise along a row of bean vines, vine lifting and straightening means at the leading end of said support comprising a pair of opposed elongated beam-like skids inclining upwardly and rearwardly in relatively converging relation from the ground and having front ends slidable over the ground, a pair of endless vine pick-up link chains embodied in said skids, respectively, and having top runs operative rearwardly along and above said skids, means to mount said skids on said leading end of the support for endwise adjustment when sliding over uneven ground, a rotary cutter on the underside of said support adjacent said leading end thereof operative for cutting off the vines straightened up by said units, means on said support operative to convey the cut vines rearwardly along said support, and driving mechanism for said pair of chains operative under operation of the last mentioned means, said driving mechanism comprising a cross shaft on said support, a pair of sprocket wheels for operating said chains, respectively, and a pair of belt and pulley connections between opposite ends of said shaft and said sprocket wheels.

3. A bean harvesting mechanism comprising an elongated support adapted to be propelled endwise along a row of bean vines, vine lifting and straightening means at the leading end of said support comprising a pair of opposed elongated beam-like skids inclining upwardly and rearwardly in relatively converging relation from the ground and having front ends slidable over the ground, a pair of endless vine pick-up link chains embodied in said skids, respectively, and having top runs operative rearwardly along and above said skids, means to mount said skids on said leading end of the support for endwise adjustment when sliding over uneven ground, a rotary cutter on the underside of said support adjacent said leading end thereof operative for cutting off the vines straightened up by said units, means on said support operative to convey the cut vines rearwardly along said support, and driving mechanism for said pair of chains operative under operation of the last-mentioned means, the last-mentioned means comprising a pair of sprocket and chain units mounted on top of said support in a common horizontal plane and including inner runs opposed parallel upon opposite sides of the longitudinal center of the support in close together relation.

4. In a bean harvesting mechanism a pair of opposed vine pick-up and straightening units adapted to be propelled along a row of vines upon opposite sides thereof, respectively, comprising a pair of elongated beam-like skids having under beveled front ends adapted to slide over the ground, a support, means to mount said skids on said support in upwardly and rearwardly inclined position and converging relation, said means comprising a pair of brackets having lateral edge guides, said skids having longitudinal guide ways therein in which said guides are slidably fitted whereby the skids are endwise adjustable when sliding over uneven ground.

5. In a bean harvesting mechanism a pair of opposed vine pick-up and straightening units adapted to be propelled along a row of vines upon opposite sides thereof, respectively, comprising a pair of elongated beam-like skids having under beveled front ends adapted to slide over the ground a support, means to mount said skids on said support in upwardly and rearwardly inclined position and converging relation, said means comprising a pair of brackets having lateral edge guides, said skids having longitudinal guide ways therein in which said guides are slidably fitted whereby the skids are endwise adjustable when sliding over uneven ground, a pair of endless vine pick-up and straightening link chains, embodied in said skids respectively and having top runs operative rearwardly along and above said skids, and means to operate said chains including a pair of sprocket wheels mounted on said brackets, respectively, and engaging the lower runs of said chains respectively.

RALPH DIXON.